Aug. 23, 1966   C. R. VALENTINE   3,267,903
DEVICE FOR THE PREPARATION OF A COW'S UDDER FOR MILKING
Filed Feb. 8, 1965

INVENTOR.
CLARENCE R. VALENTINE
BY Ernest Carl Edge

United States Patent Office 3,267,903
Patented August 23, 1966

3,267,903
DEVICE FOR THE PREPARATION OF A COW'S
UDDER FOR MILKING
Clarence R. Valentine, Davie, Fla.
(Rte. 4, Rupert, Idaho 83350)
Filed Feb. 8, 1965, Ser. No. 430,959
3 Claims. (Cl. 119—1)

This invention relates in general to a dairy tool and in more particularity to a device for the preparation of a cow's udder for milking.

In order to prepare a cow for milking there are several steps to go through and tasks to perform before the milking machine can be placed on the udder.

The common practice in the dairy industry today is for someone to squirt cold water on the cow's udder to remove the larger deposits of dirt which have accumulated thereon. An ordinary hose and nozzle which provides a strong stream of water is used.

The cold water hose is discarded and a hose supplying warm water is then used on the udder in order to warm it so that the cow will give down her milk. As the warm water is applied to the udder, the worker usually takes his bare hand and wipes off any visible deposits of dirt which were not washed off by the cold water.

After the warm water has been applied to the udder the worker lays aside the warm water hose and takes his strip cup or strip pad to test the milk in each teat. The process of testing for infection is well known in the art and is fully disclosed in Patent No. 2,460,101.

After the strip pad is used, it is rinsed off for use on another cow and the first cow is now ready for milking.

As can be realized, each of the above steps takes time and considerable movement on the part of the man doing the work.

It is a primary object of my invention to provide a device which will enable the worker to accomplish several of the above operations by the utilization of a single tool for performing them. More specifically, it is a primary object of the invention is to provide a single device which may be used for warming the udder of the cow, washing off the deposits of dirt, and sampling the milk for possible teat infection.

It is a further object of the invention to locate the strip pad in such a relationship to the cleaning elements of the tool that it is automatically washed off so as to be ready for the sampling operation.

It is a still further object of the invention to provide a device for preparation of a cow's udder for milking which is sturdy in construction, light in weight thereby making it easy to use, and relatively simple to manufacture.

Figure 1:
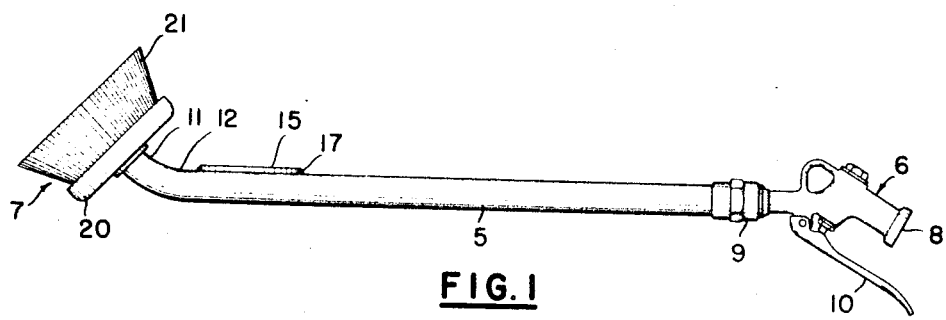
Figure 2:
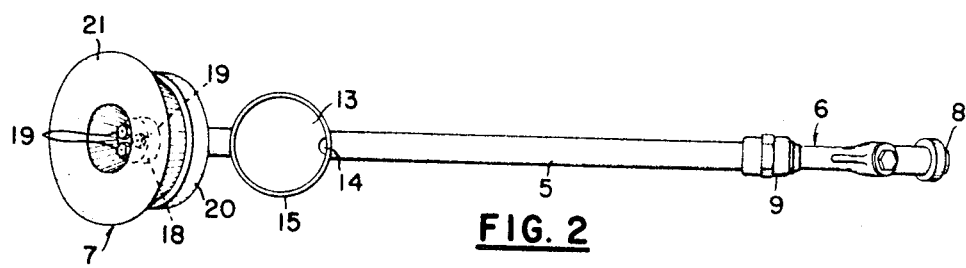
Figure 3:
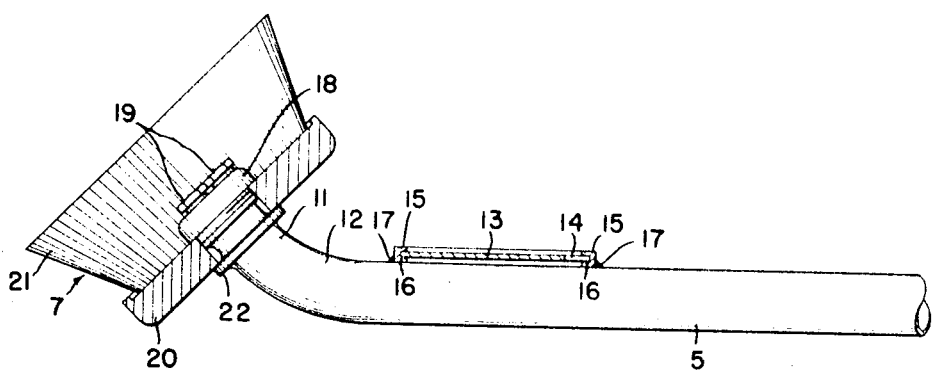
Figure 4:
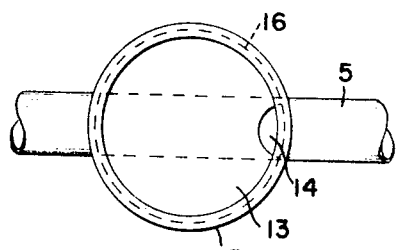

Further objects, advantages, and capabilities of my invention will be more apparent from the following description, taken in conjunction with the accompanying drawing, in which:

FIGURE 1 is an elevational view of my device;
FIGURE 2 is a plan view;
FIGURE 3 is an enlarged cross-sectional view of the brush and the strip pad; and
FIGURE 4 is an enlarged plan view of the strip pad.

Referring now to the drawing, FIGURE 1 shows a water supply pipe 5 with a control valve 6 at one end and a brush 7 at the opposite end thereof. The control valve 6 is illustrated as a type well known in the art with a water inlet 8, an outlet 9 and a trigger 10. The trigger 10 actuates the inside controls of the valve which are not shown as they are not part of my invention. Any suitable control valve may be used instead of the valve 6 illustrated.

Near the end of pipe 5 it is turned upwardly to provide an upstanding portion 11. It has been found that in actual operation best results are obtained when the angle between section 11 and a horizontal plane through pipe 5 is 45°. However, circumstances may dictate that the operator or user would want the brush at a different angle; this may be done and still fall within the purview of this specification.

Near the location 12 where upstanding portion 11 joins the main body section of pipe 5 is located strip pad 13. It is shown here as a flat circular disc with a cut out portion 14 and is held on member 5 by means of ring 15. Referring to FIGURE 3, ring 15 is provided with an annular groove 16 on the inside thereof into which pad 13 fits. Ring 15 is secured to pipe 5 by means of welds 17.

Attached to the end of section 11 is nozzle 18 with outlets 19. This may take the form of any nozzle, however in actual use for warming the udder of the cow it is preferred that it be a fogging type nozzle.

Surrounding nozzle 18 is brush 7 which consists of base member 20 and bristles 21. Bristles 21 should be made of a relatively soft and flexible material so as not to bruise or scratch the udder of the cow. Base member 20 is held against flange 22 of section 11 by means of nozzle 18.

As will be noted, the bristles 21 extend well beyond the outlets 19 of nozzle 18 so that the bristles may be used for cleaning with the danger of the nozzle hitting the udder substantially eliminated.

Operation of my invention is as follows: with inlet 8 attached to a warm water supply, the outlets 19 of nozzle 18 are aimed toward the udder of the cow and the trigger 10 is actuated. The nozzle sprays a fogging type spray over the surface of the udder and bristles 21 are then used to rub against the udder to wash away any dirt or deposits on the udder. As this operation is being performed some water from bristles 21 will flow downwardly over strip pad 13 and through opening 14 therein, thereby washing off any milk present thereon from the sampling of the milk of the preceding cow.

After the bag is washed and warmed in this operation the water supply is turned off by trigger 10. The device is then moved into a position so that strip pad 13 is directly below one of the teats. A sample of the milk is squeezed onto the pad, a sample of the second teat is squeezed onto the pad, etc., until all teats are visually tested for possible infection. If no infection is present the udder is then in condition for attachment of the milking machine.

Once the test has been completed the worker may move on to the next cow and, as set forth above, the milk from the preceding cow will be washed from the strip pad 13 during the warming and washing of the udder of the second cow.

Thus it will be seen that I have provided a device for preparing a cow's udder for milking which may be used by the worker without having to remove himself from the immediate vicinity of the cow, and which may be accomplished without the use of a plurality of tools or devices independent of each other, each of which requires special handling and manipulation. According to my invention the worker has a unitary structure which may be used to perform three tasks with great ease and agility.

Although only one embodiment of my invention has been shown, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

What is claimed is:

1. A device for the prepartion of a cow's udder for milking comprising
    (a) a tubular handle section for connection to a water supply,
    (b) valve control means on said handle for controlling the flow of water through said handle,
    (c) a nozzle at one end of said handle,
    (d) brush means surrounding said nozzle, and
    (e) a strip pad located on said handle adjacent the nozzle and in the path of deflected water flow from said nozzle and brush.

2. A device for the preparation of a cow's udder for milking comprising
    (a) an elongated handle,
    (b) said handle having means therein for the travel of liquid therethrough,
    (c) valve control means for controlling the flow of liquid through said handle,
    (d) an upturned portion on the opposite end of said handle,
    (e) said upturned portion having a nozzle on the end thereof,
    (f) a brush located contiguous to said nozzle, and
    (g) a strip pad located on said handle near the upturned portion in the path of deflected liquid flow.

3. A device for the preparation of a cow's udder for milking comprising
    (a) an elongated handle,
    (b) said handle forming a liquid supply line.
    (c) a control on one end of said handle for regulating the flow of liquid,
    (d) an extension of said handle extending at an angle to the main body portion,
    (e) a liquid outlet on said extension,
    (f) a brush surrounding said liquid outlet,
    (g) a strip pad on said handle for use in visual testing of the milk of the cow, and
    (h) said strip pad located on the handle near the angle formed by said extension and the main body portion in the path of deflected liquid flow.

References Cited by the Examiner

UNITED STATES PATENTS

| | | | |
|---|---|---|---|
| 1,304,094 | 5/1919 | Quimby | 15—589 X |
| 1,333,146 | 3/1920 | Wilson | 15—604 |
| 1,484,026 | 2/1924 | Jacobs | 15—603 X |
| 2,460,101 | 1/1949 | McMurray | 88—14 |
| 2,532,251 | 11/1950 | Whitmire et al. | 119—159 |
| 2,694,546 | 11/1954 | Goode | 15—591 X |
| 2,731,300 | 1/1956 | Jansen | 119—159 X |

FOREIGN PATENTS 563,301    5/1957    Italy.

SAMUEL KOREN, *Primary Examiner.*

A. F. MEDBERY, *Examiner.*